United States Patent
Styles et al.

(10) Patent No.: US 10,490,886 B2
(45) Date of Patent: Nov. 26, 2019

(54) MOUNT

(71) Applicant: TRW Limited, Solihull, West Midlands (GB)

(72) Inventors: Robert Styles, Solihull (GB); Luke Keene, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 273 days.

(21) Appl. No.: 15/524,745

(22) PCT Filed: Nov. 5, 2015

(86) PCT No.: PCT/GB2015/053354
§ 371 (c)(1),
(2) Date: May 5, 2017

(87) PCT Pub. No.: WO2016/071696
PCT Pub. Date: May 12, 2016

(65) Prior Publication Data
US 2017/0324155 A1    Nov. 9, 2017

(30) Foreign Application Priority Data
Nov. 7, 2014 (GB) .................................. 1419861.8

(51) Int. Cl.
*F16M 13/00* (2006.01)
*H01Q 1/32* (2006.01)
(Continued)

(52) U.S. Cl.
CPC .......... *H01Q 1/3233* (2013.01); *F16M 13/02* (2013.01); *G01S 7/4026* (2013.01); *G01S 13/931* (2013.01);
(Continued)

(58) Field of Classification Search
CPC ......... F16B 5/0216; G01S 7/4004; G01S 7/40
(Continued)

(56) References Cited

U.S. PATENT DOCUMENTS 824,525 A    6/1906  Bonney
5,043,750 A * 8/1991  Yamaguchi ............ F16M 11/40
                                                         248/163.1
(Continued)

FOREIGN PATENT DOCUMENTS

CN    201917754 U    8/2011
DE    19739298 C1    11/1998
(Continued)

OTHER PUBLICATIONS

Patents Act 1977: Search Report under Section 17(5), Application No. GB1419861.8, dated May 8, 2015.
(Continued)

*Primary Examiner* — Steven M Marsh
(74) *Attorney, Agent, or Firm* — MacMillan, Sobanski & Todd, LLC

(57) ABSTRACT

A mount for mounting an object, such as non-exclusively a radar sensor, on a surface, such as one of a vehicle, the mount comprising: a carrier; a fixed length strut which has a fixed length from a mounting point arranged to engage the surface and a pivot point about which it is mounted pivotally on the carrier; and two variable length struts, which each have a variable length from a mounting point arranged to engage the surface and a pivot point about which it is mounted pivotally on the carrier.

14 Claims, 2 Drawing Sheets

(51) Int. Cl.
*G01S 13/93* (2006.01)
*G01S 7/40* (2006.01)
*H01Q 1/12* (2006.01)
*F16M 13/02* (2006.01)

(52) U.S. Cl.
CPC ........ H01Q 1/125 (2013.01); *G01S 2007/403* (2013.01); *G01S 2007/4034* (2013.01)

(58) Field of Classification Search
USPC ......... 248/125.7, 170, 440, 187.1, 660, 663, 248/288.31, 288.51
See application file for complete search history.

(56) References Cited

U.S. PATENT DOCUMENTS

| | | | |
|---|---|---|---|
| 5,156,366 A * | 10/1992 | Anderson | A63B 55/57 248/96 |
| 5,743,618 A | 4/1998 | Fujino et al. | |
| 6,322,275 B1 | 11/2001 | Schmidt et al. | |
| 7,243,885 B2 | 7/2007 | Zeiher et al. | |
| 9,279,437 B2 | 3/2016 | Gold et al. | |
| 2005/0151036 A1 | 7/2005 | Speggiorin | |
| 2010/0019109 A1 | 1/2010 | Liu | |
| 2012/0320596 A1 | 12/2012 | Hastings | |
| 2014/0175248 A1 | 6/2014 | Fan et al. | |
| 2015/0109695 A1 * | 4/2015 | Blumenthal | G02B 7/183 359/853 |
| 2017/0045066 A1 * | 2/2017 | Couto Maquieira | F16B 5/0233 |

FOREIGN PATENT DOCUMENTS

| | | |
|---|---|---|
| DE | 102011119392 A1 | 5/2013 |
| WO | 03039917 A1 | 5/2003 |

OTHER PUBLICATIONS

International Search Report and Written Opinion, Application No. PCT/GB2015/053354, dated Feb. 8, 2016.

* cited by examiner

MOUNT

CROSS-REFERENCE TO RELATED APPLICATIONS

This application is a national stage of International Application No. PCT/GB2015/053354, filed 5 Nov. 2015, the disclosures of which are incorporated herein by reference in entirety, and which claimed priority to Great Britain Patent Application No. 1419861.8, filed 7 Nov. 2014, the disclosures of which are incorporated herein by reference in entirety.

BACKGROUND OF THE INVENTION

This invention relates to a mount for mounting an object on a surface.

It is known to provide radar sensors on vehicles such as automobiles; typically, these can be provided to provide such functions as parking sensors or sensing of other vehicles whilst the vehicle is moving. When installing the radar sensors, it is desirable to be able to adjust and calibrate the positioning of such sensors so that they face in a desired direction. Typically, the radar sensor would be installed on the vehicle, and then the position adjusted so that it is correct after installation.

Adjustable mounts have been proposed for such a purpose, but only limited room is available for such mounts in the space provided for a parking sensor. This limited space limits the amount of angular adjustment that is possible.

Whilst the discussion above is with respect to the mounting of radar sensors, it is generally desirable to increase the flexibility of mounting solutions generally.

BRIEF SUMMARY OF THE INVENTION

According to a first aspect of the invention, there is provided a mount for mounting an object on a surface, the mount comprising:
- a carrier;
- a fixed length strut which has a fixed length from a mounting point arranged to engage the surface and a pivot point about which it is mounted pivotally on the carrier; and
- two variable length struts, which each have a variable length from a mounting point arranged to engage the surface and a pivot point about which it is mounted pivotally on the carrier.

As such, this provides a simple mount than can pivot about two axes whilst potentially reducing the overall package size.

The variable length struts may each comprise a threaded member. Each pivot point may comprise a body which is at least part spherical with a threaded bore therethrough, the threaded member engaging the threaded member. As such, rotation of the threaded member may cause the body to move along the threaded member, thus varying the variable length.

The mount may further comprise a base arranged to be fixed to the surface. As such, mounting point of each of the variable and fixed length struts may be on the base. The mounting point of each of the variable length struts may allow the variable length strut to rotate relative to the base, but may restrict or prevent movement of the variable length strut axially along the length and pivotal movement of the variable length strut about the mounting point.

Each body may be mounted in the carrier in a complementary bearing. As such, the bearing may be at least part spherical.

Each variable length strut may comprise drive engagement means, such as a hexagonal bore, by means of which the variable length strut can be rotated. Typically, the rotation could be manual, or may be driven by a motor, such as an electric motor.

The fixed length strut may be fixed relative to the base. The pivot point of the fixed length strut may comprise a ball and socket joint.

Typically, the mounting point of the fixed length strut will be between the mounting points of the variable length strut parallel to a direction joining the mounting points of the variable length strut. This can reduce the length of the variable length struts required to achieve a given range of angular adjustment. Typically, where the carrier has a lateral extent along a direction joining the mounting points of the variable length strut, the mounting point of the fixed length strut will be in a central 25%, 10% or 5% of the lateral extent.

According to a second aspect of the invention, there is provided a mounted radar sensor, comprising a radar sensor and a mount in accordance with the first aspect of the invention, in which the radar sensor is mounted on the carrier.

As such, this allows for the direction in which the radar sensor is mounted to be adjusted.

According to a third aspect of the invention, there is provided a vehicle having the mounted sensor of the second aspect of the invention mounted thereon. Typically, the base of the mount is fixed relative to a surface of the vehicle.

According to a fourth aspect of the invention, there is provided a method of adjusting the orientation of the radar sensor on the vehicle of the third aspect of the invention, the method comprising varying the length of the variable length struts such that a desired orientation is achieved. Typically, this will be achieved by rotating the variable length struts.

Other advantages of this invention will become apparent to those skilled in the art from the following detailed description of the preferred embodiments, when read in light of the accompanying drawings.

DETAILED DESCRIPTION OF THE INVENTION

Figure 1:
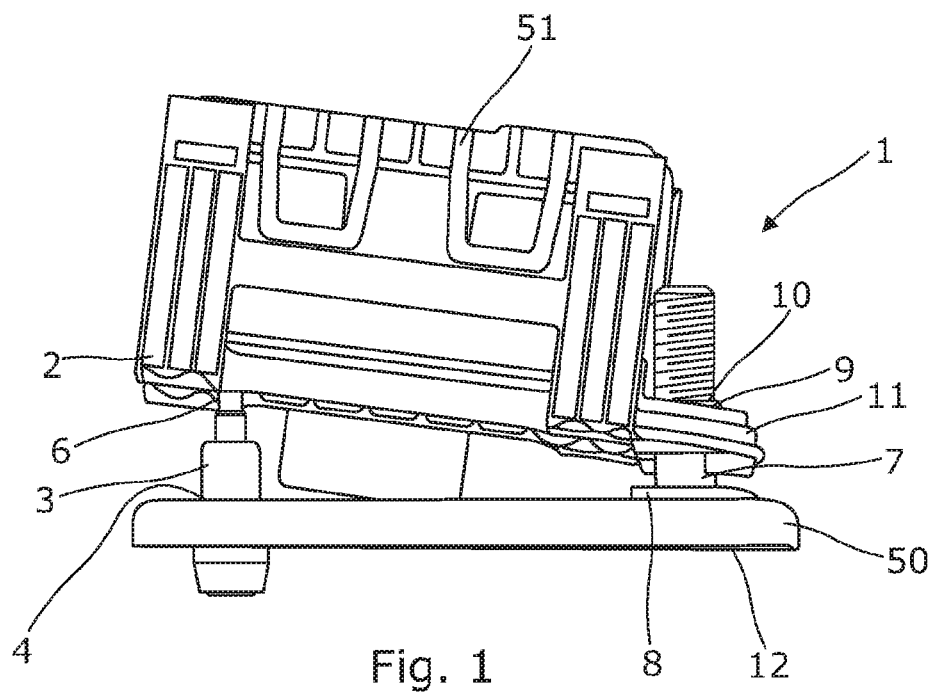
FIG. 1 shows a side elevation of a mount in accordance with an embodiment of the invention.
Figure 2:
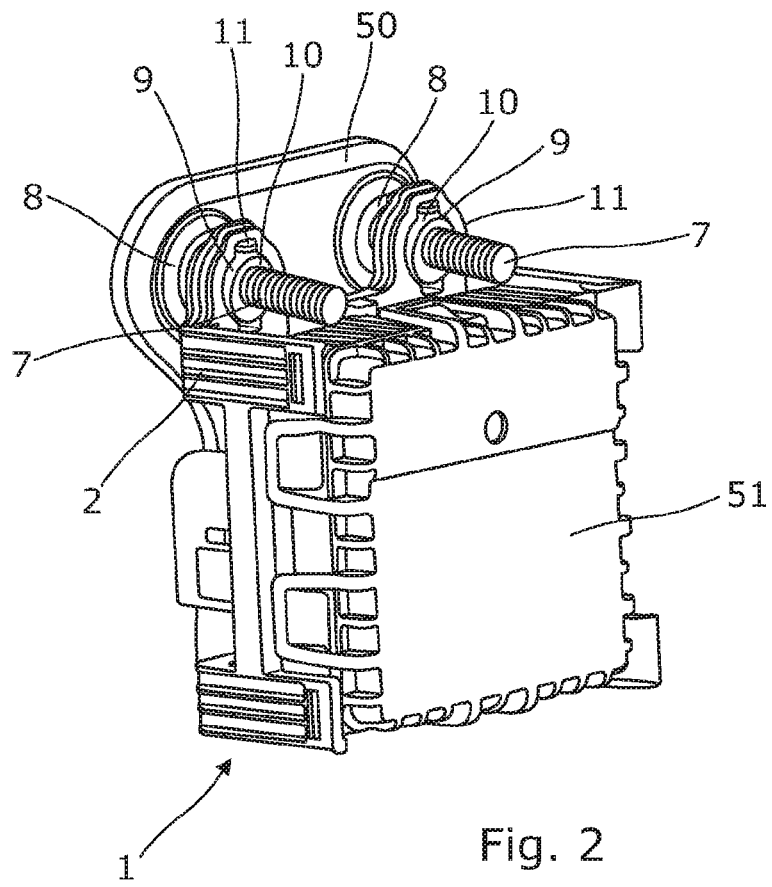
FIG. 2 shows a perspective view of the mount of FIG. 1.

The accompanying drawings show a mount 1 which is used to support a package 51—in this case a radar sensor—relative to a base 50. In this embodiment, the base 50 would be fixed relative to the surface of a vehicle (not shown). As will be demonstrated below, the mounting allows the direction which the package 51 faces relative to the base to be adjusted about two axes.

The mount 1 comprises a carrier 2 which supports the package 51; typically the package 51 would be clipped into the carrier 2. The carrier is mounted on the base through three struts 3, 7.

Figure 3:
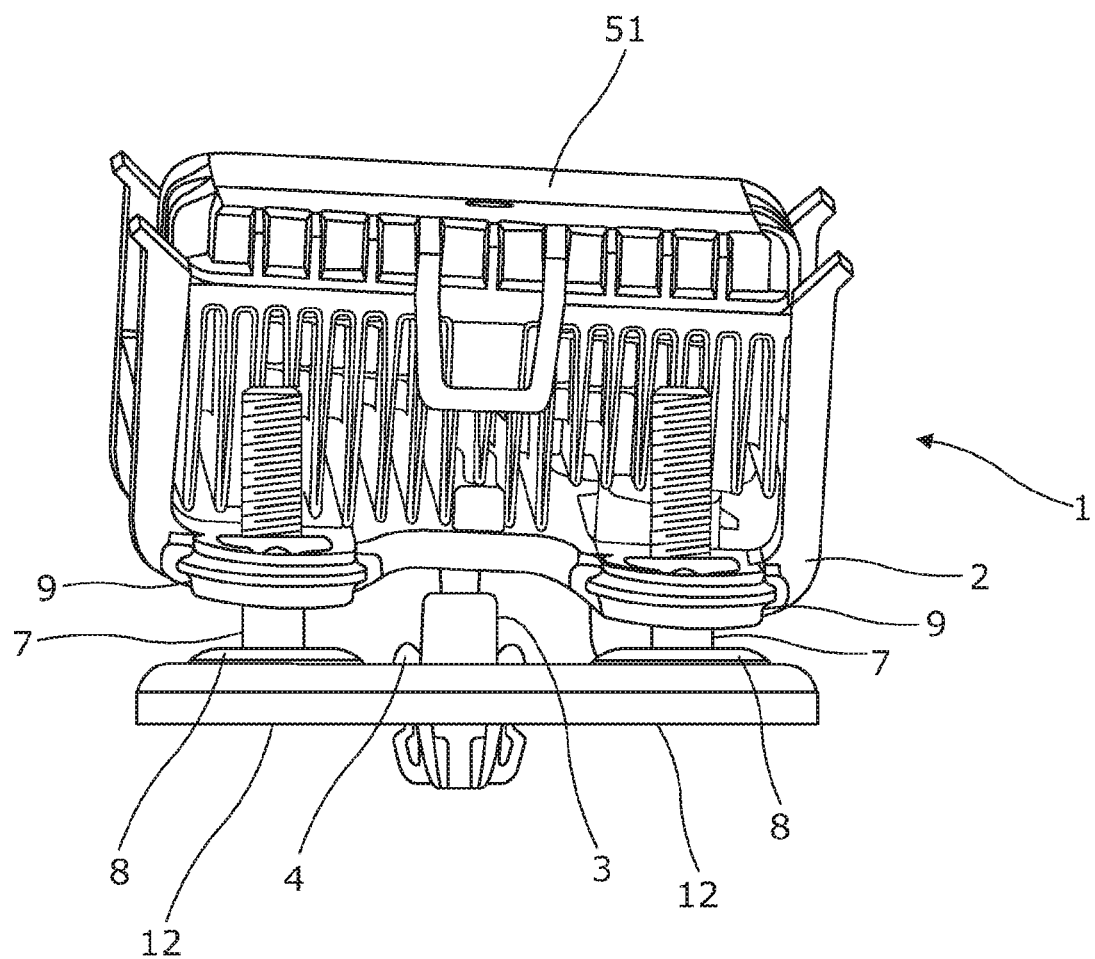
FIG. 3 shows a further side elevation of the mount of FIG. 1, from a viewpoint 90 degrees from that of FIG. 1.

One of the struts is a fixed length strut 3 which has a fixed length from a mounting point 4 at which it is fixed relative to the base 50 to a pivot point 6, of the form of a ball and socket joint, about which it is pivotally mounted on the carrier. The pivot point 6 is at one end of the carrier along a first lateral extent (horizontally in FIG. 1 of the accompanying drawings) whilst being approximately on the midpoint of the carrier along a second orthogonal lateral extent (horizontally in FIG. 3 of the accompanying drawings).

The other two struts are variable length struts 7. They are each of the form of threaded members, which are held captive at mounting points 8 in the base 50; the mounting points 8 allow rotation of the threaded members about their length, but no linear or other rotational motion. The variable length struts 7 also engage pivot points 9 on the carrier. Each of these pivot points 9 comprises a part-spherical member 10 having a threaded bore therethrough, the part-spherical member being housed in a corresponding part-spherical bearing in the carrier. The pivot points 9 are positioned at the other end of the first lateral extent to the pivot point 6 of the fixed length strut 3 in the carrier 2, and at opposing ends of the second lateral extent.

As such, rotation of the threaded members will change the lengths between the mounting point 8 of the variable length struts 7 in the base 50 and the pivot points 9 in the carrier. By rotating the two threaded members together (using a drive means coupled to a drive face 12 of the variable length struts 8, such as a hex socket), the carrier will rotate in the plane of FIG. 1 (that is, a plane parallel to the first extent). Rotating the threaded members in opposite senses will cause the carrier to rotate in the plane of FIG. 3 (that is, a plane parallel to the second extent).

Thus, two degrees of rotational freedom are provided (typically elevation and azimuth), without a necessity for any lateral movement of an adjuster arm or screw. Typically, an angular range of movement of up to six degrees if not more can be provided; there will be some deformation of the struts at the extremes of adjustment due to the angular movement of the carrier, but that can easily be accommodated, especially where the struts are formed of a plastic material. The arrangement discussed can allow the mounting to occupy less space. Having the pivot point 6 of the fixed length strut 3 in the centre of the first extent allows the maximum length of the variable length struts for a given adjustment range to be reduced.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A mount for mounting an object on a surface, the mount comprising:
    a carrier;
    a fixed length strut which has a fixed length from a mounting point arranged to engage a surface and a pivot point about which the fixed length strut is mounted pivotally on the carrier; and
    two variable length struts, which each have a variable length from a mounting point arranged to engage the surface and a pivot point about which the variable lengths struts are mounted pivotally on the carrier;
    in which the variable length struts each comprise a threaded member; and
    in which each pivot point of the variable length struts comprises a body which is at least part spherical with a threaded bore therethrough, the threaded member engaging the threaded bore.

2. The mount of claim 1, comprising a base arranged to be fixed to the surface.

3. The mount of claim 2, in which the mounting point of each of the variable and fixed length struts is on the base.

4. The mount of claim 2, in which the mounting point of each of the variable length struts allows the variable length strut to rotate relative to the base, but restricts or prevents movement of the variable length strut axially along the variable length and pivotal movement of the variable length strut about the mounting point.

5. The mount of claim 1 in which each body is mounted in the carrier in a complementary bearing.

6. The mount of claim 5 in which each bearing is at least part spherical.

7. The mount of claim 1, in which each variable length comprises drive engagement means by means of which the variable length strut can be rotated.

8. The mount of claim 2, in which the fixed length strut is fixed relative to the base.

9. The mount of claim 1, in which the pivot point of the fixed length strut comprises a ball and socket joint.

10. The mount of claim 1, in which the mounting point of the fixed length strut will be between the mounting points of the variable length strut parallel to a direction joining the mounting points of the variable length strut.

11. The mount of claim 10, in which the carrier has a lateral extent along a direction joining the mounting points of the variable length strut, the mounting point of the fixed length strut being in a central 25%, 10% or 5% of the lateral extent.

12. A mounted radar sensor, comprising a radar sensor and the mount in accordance with claim 1, in which the radar sensor is mounted on the carrier.

13. A vehicle having the mounted radar sensor of claim 12 mounted thereon.

14. A method of adjusting an orientation of the mounted radar sensor of claim 13, the method comprising varying the length of the variable length struts such that a desired orientation is achieved.

* * * * *